Sept. 11, 1962 L. D. GADDINI 3,053,203
COMBINATION CUTTING AND TRANSFERRING DEVICE
Filed May 12, 1961
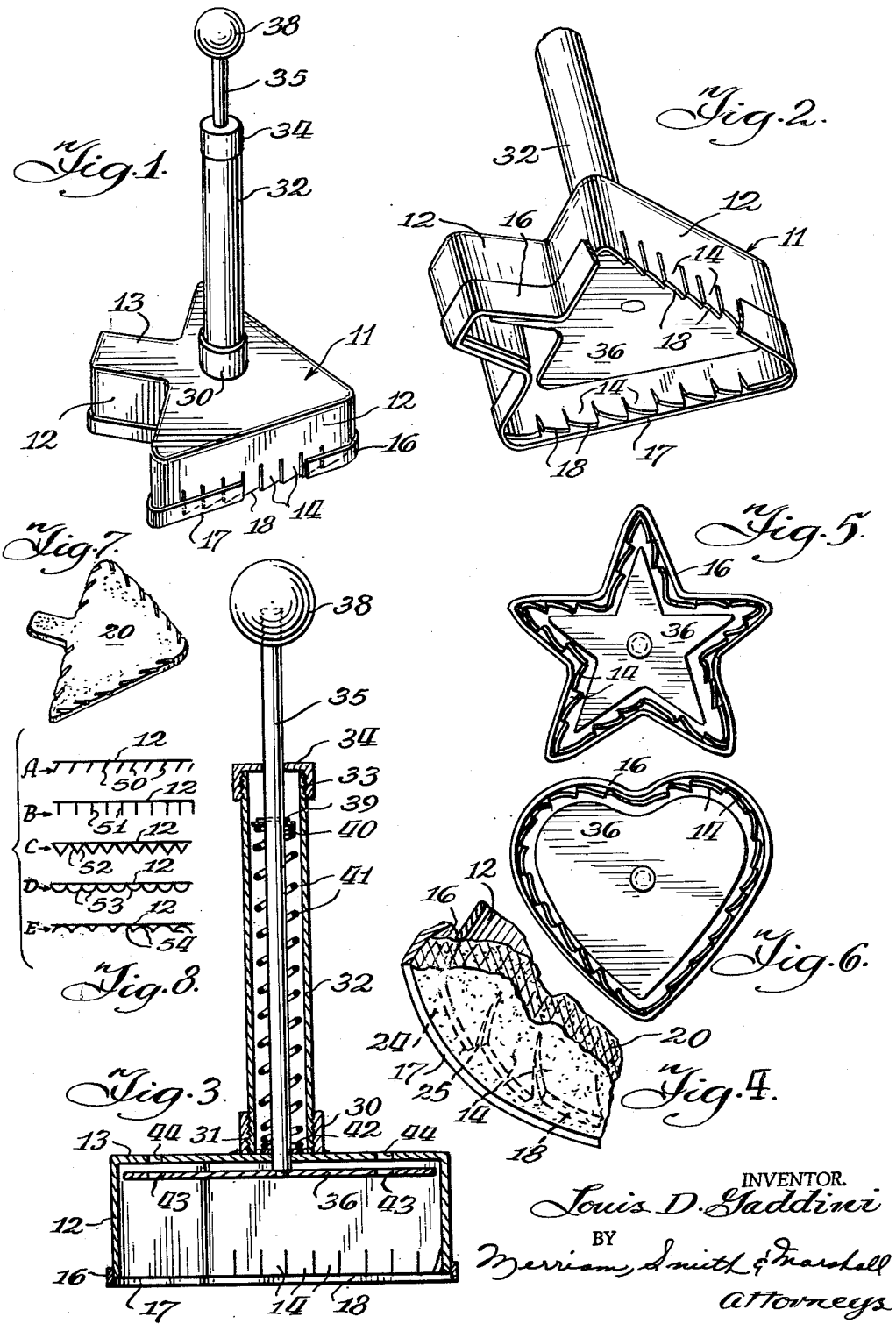
INVENTOR.
Louis D. Gaddini
BY
Merriam, Smith & Marshall
Attorneys

3,053,203
COMBINATION CUTTING AND TRANSFERRING DEVICE
Louis D. Gaddini, 1110 Lathrop, Forest Park, Ill.
Filed May 12, 1961, Ser. No. 109,601
8 Claims. (Cl. 107—47)

The present invention relates generally to a device used in die-cutting shapes from plastic material having a doughy consistency, as in the die-cutting of cookies from a sheet of dough, and more particularly to a device which die-cuts the shape and engages and holds the shape to facilitate its transfer from one location to another.

Shapes (such as cookies and the like) die-cut from material having a doughy consistency are conventionally transferred from a first location (such as a counter-top) to a second location (such as a baking pan) by initially removing the ring of uncut material surrounding the die-cut shape and then picking up the die-cut shape with a spatula or similar utensil to perform the transfer. This method is rather time-consuming and requires the provision of a shape-transferring device (i.e., the spatula) in addition to a device for die-cutting the shape from the doughy material. The present invention provides a combination cutting and shape-transferring device which eliminates the need of providing the additional transferring tool as well as cutting down substantially on the time required to perform the transferring operation.

Essentially, the subject device comprises an inner holding member within a peripherally surrounding outer die-cutting member with the bottom edge of the holding member spaced above the bottom die-cutting edge of the cutting member a distance less than the thickness of the material to be cut. The bottom die-cutting edge of the outer member defines the shape of the cut-out portion of material, and the inner holding member includes a plurality of peripherally arranged tooth-like bottom portions which penetrate through the top surface of the cut-out shape and engage and hold the shape during the transferring operation. The subject device is also provided with manually actuated extracting means for disengaging the shape after the latter has been transferred from the first to the second location.

The cutting and transferring steps of an operation using the subject invention are performed rapidly in sequence, with both the cutting and the engaging being accomplished by a single downward movement of the subject device onto the material to be cut. The degree of engagement between the holding means and the cut-out shape is quite substantial, with little danger of the cut-out shape being disengaged during the transferring operation. Virtually the only way to disengage the cut-out shape from the device is by actuating the extracting means.

Devices constructed in accordance with the subject invention may be used to cut out and transfer articles of virtually any shape, the only requirement being that the device itself have an outline corresponding to the outline of the shape to be cut.

Other features and advantages are inherent in the structure claimed and disclosed, as will become apparent to those skilled in the art from the following detailed description in conjunction with the accompanying drawings wherein:

FIGURE 1 is a perspective view, partially cut away, of one embodiment of a combination cutting and transferring device constructed in accordance with the present invention and intended to cut out a spade-shaped article;

FIGURE 2 is another perspective view, as seen from below, of the device of FIGURE 1;

FIGURE 3 is a vertical sectional view of the device of FIGURE 1;

FIGURE 4 is a fragmentary perspective view, as seen from below, showing how a cut-out shape of material is held by the subject device;

FIGURE 5 is a bottom view of another embodiment of a combination cutting and transferring device constructed in accordance with the subject invention, and intended to cut out a star-shaped article;

FIGURE 6 is a view similar to FIGURE 5 and showing still another embodiment of the subject device and intended to cut out a heart-shaped article of material;

FIGURE 7 is a perspective view of the shape of material cut out by the device shown in FIGURES 1 to 3; and FIGURE 8 is a schematic view illustrating various types of holding means in a device constructed in accordance with the subject invention.

Referring initially to FIGURES 1 to 3, there is shown a spade-shaped embodiment of a cutting and transferring device constructed in accordance with the subject invention, said device comprising an inner holding or engaging member constituting a housing indicated generally at 11 and including side walls 12, a top wall 13, and an open bottom end. Surrounding the lower portion of housing 11 is an outer peripheral cutting member 16. The inner holding member or housing 11 has a bottom edge 18 spaced above the bottom die-cutting edge 17 of the outer cutting member 16 a distance less than the thickness of the material to be cut to assure penetration of the cut out shape by the holding member. A lower portion of the inner member 11 constitutes a plurality of peripherally arranged tooth-like penetrating and engaging portions 14 located inwardly and above lower edge 17 of outer member 16 and twisted angularly to member 16.

In this particular embodiment, the outer member 16 may be attached to inner member 11 by soldering, brazing, or other methods known to those skilled in the art. It is not essential that the outer member be in the form of a ring while the inner member is in the form of a housing. These configurations may be reversed with the outer member being a housing and the inner holding means constituting a ring-shaped member, a primary requirement being that the lower edge of the inner holding means be spaced above the bottom die-cutting edge of the outer member by a distance less than the thickness of the material to be cut.

In operation, the device is pressed down upon a sheet of plastic material, such as dough, from which the shape is to be cut. The bottom die-cutting edge 17 of the outer member defines the shape to be cut, said outer member pressing all the way through the thickness of the material to effect the severance of the shape 20 (FIGURES 4 and 7) from the sheet of material. During the cutting operation, the lower edge 18 of tooth-like portions 14 penetrates through the top of the cut-out shape. At the same time the plastic material of the cut-out shape adjacent tooth-like portions 14 flows into the spaces 24 (FIGURE 4) between the tooth-like portions and the adjacent surface of the outer cutting member 16 and into the spaces 25 between each of the individual portions 14. As a result of the above-described penetration of the portions 14 into the material and flow of the material into the spaces between the individual portions 14 and between the portions 14 and the outer member 16 there is achieved a substantial degree of engagement between the cut-out shape 20 and the subject cutting and transferring device. This engagement is so substantial that when the device is lifted upwardly, the cut-out shape is held thereby against the force of gravity. Accordingly, the device may be moved from a first location (such as a counter-top supporting the sheet of material) to a second location (such as a baking pan) without danger of the cut-out shape 20 becoming disengaged from the device and falling off in transit.

After the cut-out shape 20 has been transferred to the second location, it is disengaged by plunger-like extracting means now to be described. Positioned atop housing top wall 13 is an internally threaded collar 30 for engaging an externally threaded lower portion 31 of a vertically extending tubular housing 32 having an externally threaded upper portion 33 for engaging an internally threaded cap 34. Slidably extending through axially aligned openings in cap 34 and housing wall 13 is a shaft 35 having a lower end connected to an extractor plate 36 located within housing 11 and an upper end connected to a knob 38. Attached to shaft 35 within tubular housing 32 is a first washer 39 normally engaging a second washer 40 attached to the upper end of a spring 41 surrounding shaft 35 and having a lower end connected to a lower washer 42 resting on the top wall 13 of housing 11.

Spring 41 normally urges the entire plunger-like extracting means including extractor plate 36 to the upper retracted position shown in FIGURE 3. To disengage or remove the cut-out shape 20 from the subject device the knob 38 is depressed, thereby causing downward vertical movement of shaft 35 and attached extractor plate 36. This movement continues until extractor plate 36 forces the cut-out shape 20 downwardly and effects a disengagement thereof from the holding means. After the cut-out shape 20 has been disengaged, knob 38 is released, and spring 41 then urges the entire extracting means upwardly back to the retracted position shown in FIGURE 3. During upward movement of extractor plate 36, air within the housing 12 is expelled outwardly through openings 43 in extractor plate 36 and openings 44 in top wall 13 of housing 11.

FIGURES 5 and 6 illustrate other embodiments of a combination die-cutting and transferring device constructed in accordance with the present invention. The only difference between these embodiments and that illustrated in FIGURES 1 to 3 is that the outer member, the inner member, and the extractor plate all have star-shaped or heart-shaped configurations rather than being spade-shaped. Furthermore, all of these embodiments are merely exemplary since the device may have any shape so long as it corresponds to the shape to be cut from the material.

In the embodiments of FIGURES 1 through 6, the toothlike portions 14 have an essentially tongue-shaped strip-like configuration usually defined by three edges with an integral upper connection to the rest of the wall 12. In these embodiments, each individual tooth-like portion 14 is twisted about a vertical axis to give the illustrated configuration. Other embodiments of engaging means may be utilized, a primary requirement being that these other embodiments of holding means have a bottom edge spaced above the bottom edge of the die-cutting member by a distance less than the thickness of the material to be cut, and that the holding means be constructed so that it penetrates through the top surface of the shape being cut, and so that there are spaces between the holding means and the die-cutting member, and/or between individual portions of the holding means for engagingly accommodating portions of the plastic cut out shape which flow into those spaces during the cutting operation.

FIGURE 8 schematically illustrates other embodiments of holding means constructed in accordance with the subject invention. In FIGURE 8, each of the illustrated embodiments is viewed from below, with the numeral 12 representing the side wall of the inner member. In embodiment A of FIGURE 8, each of the individual portions 50 of the engaging means constitutes a diagonally extending strip-like element having an integral connection to the wall 12 along one of the sides of the portion 50. The embodiment represented by B in FIGURE 8 is similar to embodiment A, the only difference being that the individual portions 51 of the holding means extend perpendicularly from wall 12. In the embodiment represented by C in FIGURE 8, each of the individual portions 52 converges toward another one of the individual portions, once again each portion 52 being integrally connected along one side thereof to wall 12. In the embodiment represented by D in FIGURE 8, each of the teeth 53 comprises a strip-like portion having a pair of integral connections at opposite sides thereof to wall 12, and each of the portions 53 bulges away from wall 12. In the embodiment represented by E in FIGURE 8, each of the individual portions 54 has an arcuate cross-section and converges toward another individual portion 54 so as to form a concave configuration.

There has thus been described a device for cutting out a shape from a material having a doughy consistency, and for transferring this shape from a first to a second location, said device holding said shape in engagement against the pull of gravity during the transferring operation, and also including means for extracting or effecting a disengagement of the shape from the device after the shape has been transferred to the second location.

The foregoing detailed description has been given for clearness of understanding only, and no unnecessary limitations should be understood therefrom, as modifications will be obvious to those skilled in the art.

What is claimed is:

1. A device for die cutting a shape from flat material having a doughy consistency and for transferring said shape from a first location to a second location, said device comprising:
   cutting means having a bottom die cutting edge outlining the shape to be cut;
   means located inwardly of and above said die cutting edge for penetrating through the top surface of said shape when the latter is being die cut and for engaging and holding the cut out shape;
   said engaging means and said cutting means defining a plurality of irregularly shaped recesses into which portions of said doughy material flow as the cutting means is pressed thereinto;
   thereinto;
   and means for disengaging said engaged shape of material.

2. A device as recited in claim 1 wherein said engaging means has a bottom edge spaced above said die cutting edge a distance less than the thickness of the material to be cut.

3. A device for die cutting and transferring shapes from flat material having a doughy consistency, said device comprising:
   a housing having a bottom edge;
   a peripheral member disposed around said housing;
   said peripheral member having a bottom die cutting edge defining the shape to be cut and spaced below said housing bottom edge a distance less than the thickness of the material to be cut;
   said housing having a plurality of strip-like portions along the bottom thereof and integral therewith;
   said strip-like portions and said peripheral member defining a plurality of irregularly shaped recesses into which portions of said doughy material flow as said cutting edge is pressed thereinto;
   and means within said housing for disengaging said engaged shape of material.

4. A device as recited in claim 3 wherein:
   each of said strip-like portions comprises a twisted tongue-shaped portion.

5. A device as recited in claim 3 wherein:
   each of said strip-like portions is tongue-shaped with an upper integral connection to said housing;
   and each tongue-shaped portion is twisted about a vertical axis.

6. A device as recited in claim 3 wherein said disengaging means comprises:
a plunger within said housing;
means mounting said plunger for movement between a lower disengaging position and an upper retracted position;
means normally urging said plunger towards said upper retracted position;
and manually operated means for moving said plunger to its lower position.

7. A device for die cutting and transferring shapes from flat material having a doughy consistency, said device comprising:
cutting means having a bottom die cutting edge outlining the shape to be cut;
a plurality of peripherally arranged tooth-like portions located inwardly of said cutting means;
each of said tooth-like portions including a lower edge spaced above said die cutting edge a distance less than the thickness of the material to be cut;
said tooth-like portions and said cutting means defining a plurality of irregularly shaped recesses into which portions of said doughy material flow as the cutting edge is pressed thereinto;
and means for disengaging said engaged shape of material.

8. A device as recited in claim 7 and comprising:
spaces between said tooth-like portions for engagingly accommodating portions of said cut-out shape which flow into said spaces during the cutting operation;
and spaces between said tooth-like portions and said outer cutting means for engagingly accommodating other portions of said cut out shape.

References Cited in the file of this patent

UNITED STATES PATENTS

| | | |
|---|---|---|
| 230,294 | Lincoln | July 20, 1880 |
| 808,015 | Coppins | Dec. 19, 1905 |
| 2,246,424 | Turner | June 17, 1941 |
| 2,379,140 | Frank | June 26, 1945 |

UNITED STATES PATENT OFFICE
CERTIFICATE OF CORRECTION

Patent No. 3,053,203 September 11, 1962

Louis D. Gaddini

It is hereby certified that error appears in the above numbered patent requiring correction and that the said Letters Patent should read as corrected below.

Column 4, line 43, strike out "thereinto;".

Signed and sealed this 1st day of January 1963.

(SEAL)
Attest:

ERNEST W. SWIDER
Attesting Officer

DAVID L. LADD
Commissioner of Patents